Oct. 16, 1923.
A. P. CRELL
1,470,814
BUMPER SUPPORT FOR AUTOMOBILES
Filed Nov. 12, 1921 2 Sheets-Sheet 1
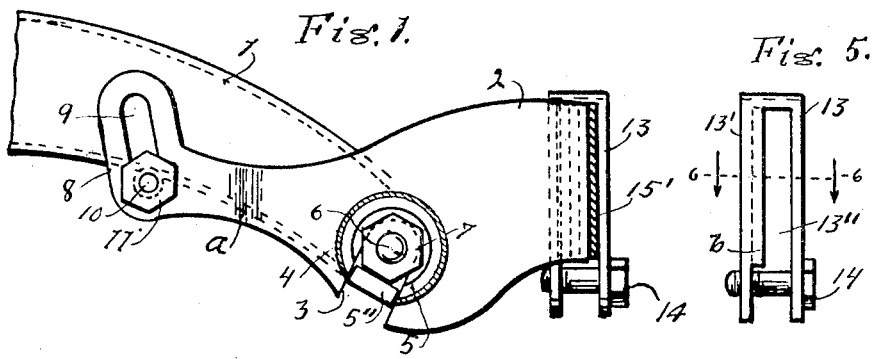
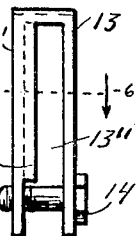
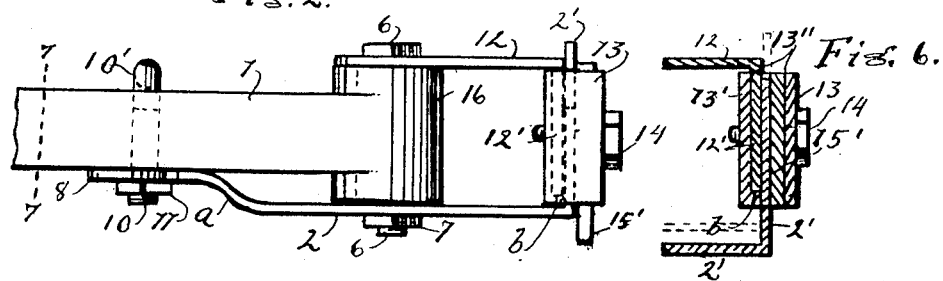
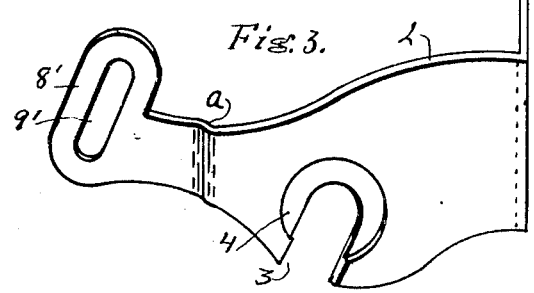
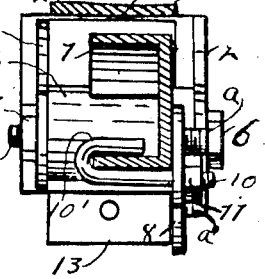
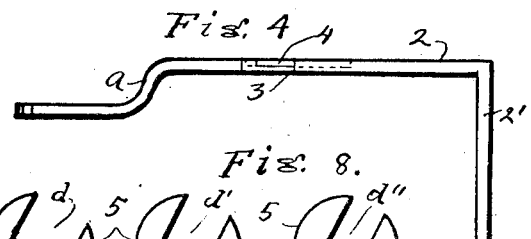
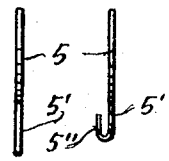
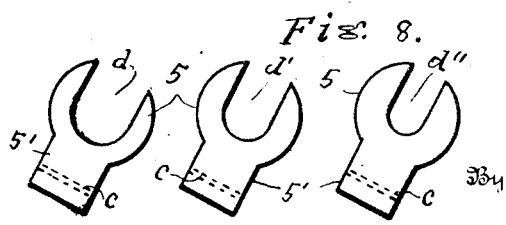
Inventor
Albert P. Crell,
Ithiel J. Cilley
Attorney Oct. 16, 1923. 1,470,814
A. P. CRELL
BUMPER SUPPORT FOR AUTOMOBILES
Filed Nov. 12, 1921 2 Sheets-Sheet 2

Inventor
Albert P. Crell,

Patented Oct. 16, 1923.

1,470,814

UNITED STATES PATENT OFFICE.

ALBERT P. CRELL, OF GRAND RAPIDS, MICHIGAN.

BUMPER SUPPORT FOR AUTOMOBILES.

Application filed November 12, 1921. Serial No. 514,617.

*To all whom it may concern:*

Be it known that I, ALBERT P. CRELL, a citizen of the United States, residing at Grand Rapids, in the county of Kent and State of Michigan, have invented certain new and useful Improvements in Bumper Supports for Automobiles, of which the following is a specification.

My invention relates to improvements in supporting brackets for bumper plates in use upon automobiles, and it has for its object; first, to provide a supporting bracket for automobile bumpers that may be adjusted for use upon any make of automobile frame; second, to provide a bracket for automobile bumpers with which the height, or relative vertical position of the bumper may be readily adjusted, and; third, to provide a means whereby the securing elements may be readily locked in place.

Figure 10:
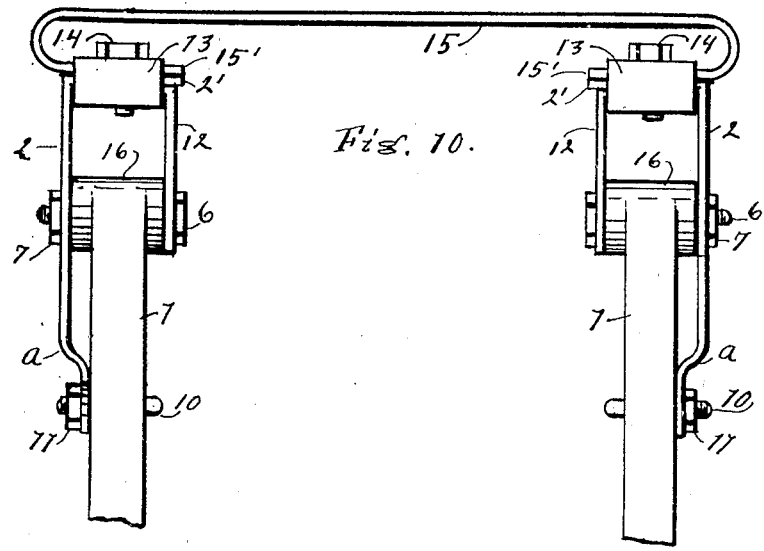
Figure 11:
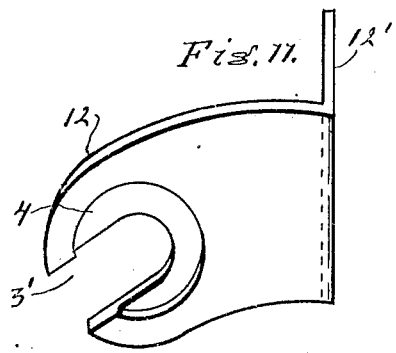

I attain these objects by the mechanism, and distribution of parts indicated in the accompanying drawing, in which Fig. 1 is an elevation of one end of the sill of an automobile frame with my device in place. Fig. 2 is a plan of the same. Fig. 3 is a perspective of the right hand outside supporting plate. Fig. 4 is a plan of the same. Fig. 5 is an edge elevation of the retaining yoke. Fig. 6 is a transverse section of the same upon the line 6—6 of Fig. 5 showing, also, the ends of the supporting bars and of the bumper bar in section. Fig. 7 is a transverse sectional elevation of the frame sill looking to the right from the line 7—7 of Fig. 2 showing the manner of securing the supporting plates to the sill. Fig. 8 shows three views in plan, of the nut lock washers used with the plates. Fig. 9 is an edge view of the same, the washer on the left plain, and the washer on the right having the stem end formed into a nut-lock. Fig. 10 is a plan of the ends of the frame sills with a bumper bar in place, and Fig. 11 is a perspective of the left hand inner supporting plate.

Similar reference characters indicate similar parts throughout the several views.

In the drawings 1 represents the ends of the automobile frame sill, which said sills are provided with annular cross heads 16 through which the bolt 6 is passed to hold supporting plates 2 and 12 by means of the nut 7.

The supporting bracket consists of the two plates, 2 and 12, and the clamping yoke 13. The yoke should be made of some very strong, semiresilient material, as malleable iron, steel, &c., and is made with two depending walls, 13 and 13' forming a receiving slot 13" for the ends of the supporting plates and of the bumper bar. The side 13' of this yoke is provided with a shoulder or stop *b*, of the exact thickness of the end 12' of the supporting plate 12, this yoke has a clamping bolt 14 that passes through a hole in the plate or side 13 and screws through a like hole in the plate 13' as indicated in Figs. 5 and 6.

The supporting plates are made in two forms. The outside plates, 2, are made longer than the inside plates 12, and all plates are provided with countersunk bearing places 4 for the reception of the washers 5, which latter are made of sheet metal having a circular, flat body 5 with a slot therein, as at *d*, made of a proper width and form to exactly fit around three sides of the bolt 6, and has a body part 5' that is to project out through the slots 3 and 3' in the supporting plates. The inside plates, 12, it will be noticed, are short, extending only from the yoke 13 backwardly to the bearing end, 16, of the frame, and has its slot 3' opening practically backwardly, while the outside plates, 2, are made longer, have downwardly opening slots 3, and extend backwardly from this point with the extreme back end provided with a slot 9 for the reception of the bolt 10. In Fig. 1 I have shown this end of the plate, designated as 8, as inclined to the left from the perpendicular, while in Fig. 3 I have shown the end 8', and the corresponding slot, 9', as inclined to the right from the perpendicular. I find this necessary for the purpose of meeting different forms of frames, though I find the position shown in Fig. 3 as far more desirable as more readily adaptable to a far greater variety of frame structure. The object of the slots, 9 and 9', is to provide a means whereby the plates may be made to swing upon the pivotal bolt 6 for the purpose of adjusting the bumper bar 15 vertically.

In assembling and applying these plates, and bumpers, the end 12', of the inside plate is first placed in the slot 13" of the yoke, with the extreme end bearing against the shoulder, *b*, or as near thereto as may be desired or necessary to provide proper sidewise adjustment of the plates, to be hereafter more fully explained. Then the ends 2' of the outside plates are placed in the slot in the yoke from the opposite edge thereof, and the yokes are placed upon the ends 15' of the bumper bar 15. When thus assembled the two pairs of supporting plates are placed upon the respective ends of the frame sills, 1, and secured in place by passing the bolt through the openings in the plates and through the openings in the ends of the sills, and are firmly secured in place by means of the nuts 7, thus forming pivotal bearings for the plates. When the plates have been thus mounted the back ends of the outside plates 2 are adjusted into desired vertical positions and the bolts 10 are placed with the hooked part, 10' hooked over the flange of the sill 1, with the ends of the bolts passing through the slots, 9, or 9', as the case may be, and firmly secured in place by the nuts 11. It will be noted that I have shown three widths of slots in the washers 5, as indicated at $d$, $d'$ and $d''$, designed to indicate that these washers are made in sets, each set being provided with slots corresponding with the diameter of the bolt to be used in securing this part of the plates to the sill.

Different weights and styles of automobiles require different weights and sizes of frame sills, as, for instance, the ends 16 of the sills vary from a minimum width of $2\frac{3}{8}$ inches to $3\frac{3}{8}$ inches in width, and to meet this difference it is necessary to make provisions for adjusting the ends 2' and 12' of the plates 2 and 12 in the yokes 13. For this purpose the ends 2' and 12' are made to fit very closely in the slot 13'', and are held securely in place by means of a properly disposed bolt, as indicated at 14 in Figs. 1, 2, 5 and 6. It will be readily understood that with this line of construction it is a simple matter to adjust any of these supports to any width of frame sill by simply placing the ends 2' and 12' a greater or lesser distance through the slot in the yoke, as indicated in Fig. 6. It is for this purpose that I have shown the ends 2' as projecting through beyond the edge of the yoke, in Figs. 2 and 10, as by this means the plate 2 may be adjusted without changing the position of the end 12' in the yoke, and without affecting the bearings of the ends 2' and 12' within the yoke.

When assembling and applying these supports, after they have been properly placed a washer 5 is chosen which has a slot $d$, $d'$, or $d''$, that will exactly fit over the bolt 6 that is necessary for use upon the particular automobile frame, and is so placed that a bearing will be formed, practically, entirely around the bolt, and is placed in the chamber or countersunk bearings 4, and the nuts 7 are screwed firmly into place. After this has been done the ends 5'' of the body 5' may be bent around, practically upon the lines $c$, to bring the extreme ends against the bearing squares of the nuts and form nut locks, as indicated in Fig. 1.

The offset at $a$, in the plate 2, may be adjusted to meet any length of projection of the end 16 beyond the surface of the sill 1, so as to properly adjust the bearing points of the supporting plates upon the sills.

These supports are designed for use upon all automobiles having the frame ends extended forwardly and backwardly from the body of the automobile. The object of the slots 3 and 3' is to enable the operator to loosen up the bolt 6, that also supports the end of the spring, and apply the plates 2 and 12 without the necessity of entirely removing the bolt.

Having thus fully described my invention, what I claim as new in the art, is:

1. In combination with the sills of an automobile frame, a short supporting plate and a long supporting plate each having one end formed at a right angle with the plate and each having an open ended slotted bearing therein, a bolt passed through the frame sill and through these slotted bearing openings to pivotally connect the plates with the sill of an automobile frame, the long plate extending backwardly beyond the point where it is secured to the sill and having an offset near the back end and having a vertically inclined slot in the back end, a bolt adapted to engage the sill and to pass through the slot in the end of the longer plate to adjustably secure the plate to the sill, and a yoke mounted upon the right angled ends of the supporting plates and adapted to securely clamp the ends of a bumper bar therewith.

2. In combination with the elements covered in claim 1, a shoulder formed along one edge of the inner surface of one side of the yoke, of equal thickness with the right-angled end of one of the plates, and bolts for securely clamping the yoke upon the ends of the plates and of the bumper bar; the plates having open slots at the main bearing points, chambered bearings adjacent to said slots, slotted washers made to co-act with said chambered bearings and the slots therein to form proper openings for the passage of bolts to secure the plates to the ends of the sills.

3. In combination with the elements covered in claim 1, the supporting plates having open slots adjacent to the main bearing points, chambered bearings adjacent to the inner ends of said slots, bolts and nuts for securing the plates to the ends of the sills, slotted washers adapted to enter the chambers over the chambered bearings and form openings for the passage of securing bolts, an arm on each washer adapted to extend outwardly through the open end of the slots, the free ends of said arms folded over upon themselves and adapted to bear against the side of the nut and form a nut lock therewith.

4. A device for securing a bumper to the frame of a vehicle, comprising a vehicle frame member of channel shape in cross section, having an enlarged apertured front portion adapted to receive a shackle bolt, a securing plate having its rear portion offset inwardly from the front portion, both portions being slotted, the front slot being adapted to engage said shackle bolt, and a hooked bolt passing through the rear slot, its hooked end engaging a flange on the said frame member.

Signed at Grand Rapids, Michigan, November 9, 1921.

ALBERT P. CRELL.